United States Patent
Bauersfeld

[19]

[11] Patent Number: 5,917,491
[45] Date of Patent: Jun. 29, 1999

[54] PAGE PROXY

[75] Inventor: Kristin Bauersfeld, Half Moon Bay, Calif.

[73] Assignee: Netscape Communications Corporation, Mountain View, Calif.

[21] Appl. No.: 08/920,960

[22] Filed: Aug. 29, 1997

[51] Int. Cl.$^6$ ........................................................ G06F 3/00
[52] U.S. Cl. ............................................................ 345/352
[58] Field of Search ..................................... 345/348, 349, 345/352, 353, 356, 357

[56] References Cited

U.S. PATENT DOCUMENTS 5,737,619  4/1998  Judson ...................................... 395/761
5,848,410  12/1998  Walls et al. ................................. 707/4

OTHER PUBLICATIONS

Cortinas, M., "Beller Navigator Bookmarks," MacWeek, v10, n21, p. 12(1), 1996.
Buchanan, L., "Power Bookmarking in Netscope—. . .", Multimedia Schools, Jan. 1997, v.4, n.1, pp. 38–40.
Schorr, J., "Slogging Through the Net," MacWorld, v14, n5, p. 137(2), May 1997.

"2,001 Tips: The Web—Browse Fooler, . . . ," Windows Magazine 1998, n.911A, p. 123.

*Primary Examiner*—A. Katbab
*Attorney, Agent, or Firm*—Michael A. Glenn

[57] ABSTRACT

A page proxy manages representations of page information, such as Web page locations in the form of Uniform Resource Locators (URLs), which are presented as Web page bookmarks. A proxy tool is provided by which a URL proxy for a Web page displayed in a browser, such the Netscape Navigator, may be readily manipulated by the use of any well known gestures, such as mouse-over and click and drag and drop (where a cursor is moved over the Web page proxy by use of a mouse, a button on the mouse is clicked to attach the proxy to the cursor, and the mouse is used to drag the proxy to a desired location, where it is then dropped by releasing the button on the mouse). The proxy tool operates in conjunction with a navigation aid that provides an organization view of destination locations and actions in the form of a drop down menu. The proxy tool may be a page proxy icon, which is located on a menu bar proximate to a Web page location field, and the navigation aid may be a drop down menu that includes hierarchically arranged contents, including multiple levels of sub-menus, and that also includes various actions, such as editing functions.

20 Claims, 5 Drawing Sheets

PAGE PROXY

BACKGROUND OF THE INVENTION

1. Technical Field

The invention relates to a proxy mechanism for identifying and using documents within electronic networks. More particularly, the invention relates to a proxy mechanism for bookmarking uniform resource locators, for example in a Web browser.

2. Description of the Prior Art

The World Wide Web ("Web") has become an important and popular tool. Every day, many new Web pages are added, such that accessing the shear volume of information available on the Web becomes a daunting task. While search engines, such as Yahoo and Alta Vista, make finding specific Web pages a more straightforward task, such search engines do not provide instant access to the desired location. Rather, one must navigate through a hierarchical menu with their Web browser until the desired location is displayed. It is therefore a common feature of the de facto standard Web browser, i.e. Netscape Navigator (manufactured by Netscape Communications Corp. of Mountain View, Calif.), to provide bookmarks for those Web pages that are frequently visited.

Bookmarks allow users to capture their current location easily for quick return later. Current bookmark designs make it easy for users to capture the location, but not to organize or make sense of what they captured. It would be desirable to retain the ability within a browser for bookmarks to be easily acquired and revisited. It would also be desirable to provide more information to users when organizing and making sense of their bookmarks. It would further be desirable to provide quick, up front categorization of such bookmarks.

SUMMARY OF THE INVENTION

The invention provides a page proxy for managing representations of page information. One such proxy manages Web page locations in the form of Uniform Resource Locators (URLs) as Web page bookmarks. As discussed above, bookmarks provide convenient and immediate access to specific Web pages. The preferred embodiment provides a proxy tool by which a URL proxy for a Web page displayed in a browser, such the Netscape Navigator, may be readily manipulated by the use of any well known gestures, such as mouse-over and click and drag and drop (where a cursor is moved over the Web page proxy by use of a mouse, a button on the mouse is clicked to attach the proxy to the cursor, and the mouse is used to drag the proxy to a desired location, where it is then dropped by releasing the button on the mouse).

The proxy tool operates in conjunction with a navigation aid that provides an organization view of destination locations and actions in the form of a drop down menu. In the preferred embodiment of the invention, the proxy tool is a page proxy icon, which is located on a menu bar proximate to a Web page location field, and the navigation aid is a drop down menu that includes hierarchically arranged contents, including multiple levels of sub-menus, and that also includes various actions, such as editing functions.

In accordance with the invention, a technique is provided that allows one to retain the ability within a browser for bookmarks to be acquired and revisited easily, while providing more information to users when organizing their bookmarks, and while providing quick, up front categorization of such bookmarks.

DETAILED DESCRIPTION OF THE INVENTION

Figure 1:
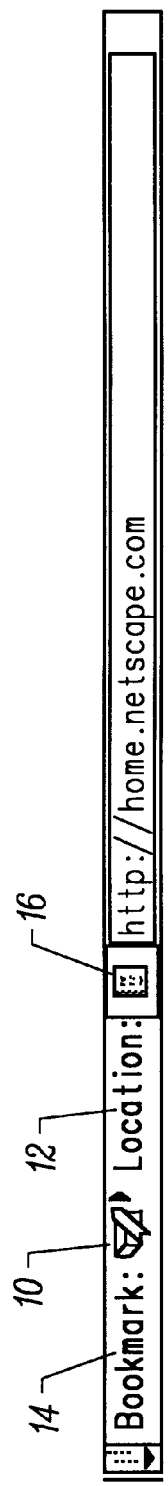
FIG. 1 is a schematic representation of a portion of a browser display showing a page proxy for bookmarking uniform resource locators (URLs) according to the invention.

The invention provides a page proxy for managing representations of page information. One such proxy manages Web page locations in the form of Uniform Resource Locators (URLs) as Web page bookmarks. As discussed above, bookmarks provide convenient and immediate access to specific Web pages. The preferred embodiment provides a proxy tool by which a URL proxy for a Web page displayed in a browser, such the Netscape Navigator, may be readily manipulated by the use of any well known gestures, such as mouse-over and click and drag and drop (where a cursor is moved over the Web page proxy by use of a mouse, a button on the mouse is clicked to attach the proxy to the cursor, and the mouse is used to drag the proxy to a desired location, where it is then dropped by releasing the button on the mouse).

The proxy tool operates in conjunction with a navigation aid that provides an organization view of destination locations and actions in the form of a drop down menu. In the preferred embodiment of the invention, the proxy tool is a page proxy icon, which is located on a menu bar proximate to a Web page location field, and the navigation aid is a drop down menu that includes hierarchically arranged contents, including multiple levels of sub-menus, and that also includes various actions, such as editing functions. It should be appreciated by those skilled in the art that, although the invention is described herein in connection with the manipulation and organization of Web page bookmarks, the invention is readily adapted for use in other applications, such as email message management.

The invention provides a robust mechanism for using bookmarks. For example, when a bookmark is entered using the page proxy mechanism described herein, information about the bookmarked location may be collected and stored for later use. Further, information may be added by the user at the time the bookmark is entered.

The following is a table of information concerning a bookmark that is collected when the bookmark is visited or added in accordance with the invention.

TABLE 1

Information Collected Regarding A Bookmark

| Type | Description |
| --- | --- |
| Page Name | Text string in the tag <TITLE>. |
| URL | The URL to the page location. |
| Date Acquired | The date that the user added the bookmark to their bookmark list in [Day Month Day Time Year]. |
| Date Last Visited | The date the user last visited the bookmarked site in [## days ago] format. |

The following is a table of fields that are available for the user to edit in accordance with the invention.

TABLE 2

User Editable Fields

| Type | Description |
| --- | --- |
| Informative Name | A text string the user can type in place of the provided page name. |
| Notes | An arbitrarily long text field where users can type in information about the page. |

The following types of information/documents are examples of what sort of things can be bookmarked in accordance with the invention:
Web pages;
Mail/News messages;
Categories;
Mail Folders;
Newsgroups; and
Files.

Bookmarks are added to messages and categories in the following way:

Newsgroups/Mail Folders: Choose "Add Bookmark" or a similar function from a bookmark icon located in or proximate to a folder window.

Categories: Get focus and selection (or similar) functions in a category pane and choose "Add Bookmark" in a thread window.

Messages: Get focus and selection (or similar) functions in a message pane and choose "Add Bookmark" in a thread window/message window.

FIG. 1 is a schematic representation of a portion of a browser display showing a page proxy for bookmarking uniform resource locators (URLs) according to the invention. In the preferred embodiment of the invention, the page proxy is implemented as an icon which represents a given window. For example, in a Web browser (FIG. 1), the proxy icon 16 represents a current location shown in a location field 12, for example a Web page, e.g. http://home.netscape.com. Various actions can be preformed on the proxy through direct manipulation.

Icon Behavior

The proxy icon 16 is animated when a gesture, such as the manipulation of a cursor by a mouse, is used to give a user an indication that the proxy icon can be manipulated. User help information, such as a tool tip, may also be displayed on mouse-over-pause, e.g. "Click on this to drag a copy of the [name of item]."

Browser Window

The proxy icon 16 is preferably presented next to the location field 12 that acts as a representative of the page, as shown in FIG. 1.

The following is a table of drag and drop actions that can be performed with the proxy icon.

TABLE 3

Proxy Icon Drag and Drop Actions

| Action | Behavior |
| --- | --- |
| Bookmark quick file | Create a link to that page in a bookmark file. |
| Bookmark window | Create a link to that page in a bookmark file. |
| Customizable Tool bar | Create a link to that page in a tool bar and adds the link to the tool bar folder in the bookmarks window. |
| Browser icon in task bar | Open that page in another browser window. |
| Another browser window | Open that page. |
| Compose Window | Attaches the page in line. |
| File system (Desktop) | Create a link to that page, e.g. an alias or shortcut. |
| Print icon | Print the page. |
| Editor window | To a selection: Make the selection a link to that page. At any insertion point: Paste the title of the page and makes a link to it. |
| Single click | No action. |
| Double click | Make a bookmark to the page. |
| Mouse-down/hold | Icon is animated to indicate that it is draggable. |
| Mouse over and pause, no click | Icon is animated to indicate draggable tool tip text: "Click on this to drag a copy of the page." |

Mail/News

Figure 2:
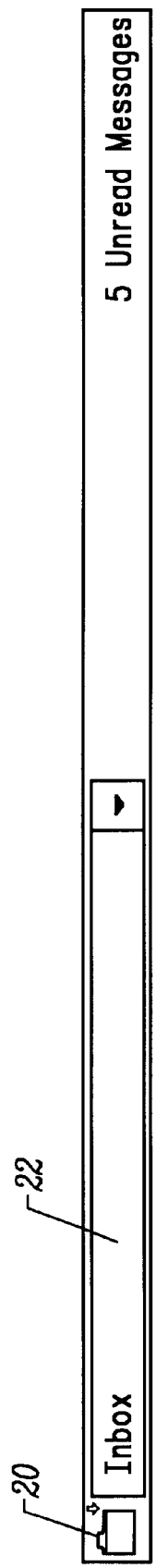
FIG. 2 is a schematic representation of a portion of a browser display showing a page proxy for a folder window according to the invention.

The proxy icon may also be used in the folder, thread, and message windows of a network interface product, such as a browser. FIG. 2 is a schematic representation of a portion of a browser display showing a page proxy for folder, thread, and message windows according to the invention. The proxy 20 appears in the banner part of the window, as shown in FIG. 2, adjacent to an Inbox field 22.

The following is a table of actions that can be performed in a folder window, such as the Inbox window shown in FIG. 2.

TABLE 4

Folder Window Actions

| Action | Behavior |
| --- | --- |
| Bookmark quick file or bookmark window | Create a link to that window in bookmarks. |
| Dragging to the File System | Create a shortcut or alias to that page. |
| Compose Window | Attach the folder and all folder contents. |
| Thread/Message Window | Open compose window and attach thread or message; or move folder and contents to a thread window. |
| Browser Window | Open contents of folder and display in browser window in list view format. |

Thread/Message Window

Where a second pane in the thread window is opened to reveal a selected message, the proxy icon still represents the thread window as a whole.

The following is a table of actions that can be performed in a thread/message window.

TABLE 5

Thread/Message Window Actions

| Action | Behavior |
| --- | --- |
| Bookmark quick file or bookmark window | Create a link to that window in bookmarks. |
| Dragging to the File System | Create a shortcut or alias to that window. |
| Compose Window | Attach the message when it is from a message window, otherwise N/A. |
| Thread/Message Window (other than sent, drafts, or outbox) | Move that message to that folder when it is from a message window (copy in the case of a news article), otherwise N/A |
| Drafts Thread Window | Copy that message to that folder and make it a draft (e.g. "save as draft") when it is from a message window, otherwise N/A |
| Message Window | N/A |
| Browser Window | N/A |

Bookmark Quick File

In the preferred embodiment of the invention, a button 10 (see FIG. 1) located to the left of the location bar and that contains the text "bookmarks" 14 is provided to users to capture and file their bookmarks quickly using a drag and drop gesture. The button also provides quick access to saved bookmarks. The button allows users to perform different actions with bookmarks.

Accessing Bookmarks

Figure 3:
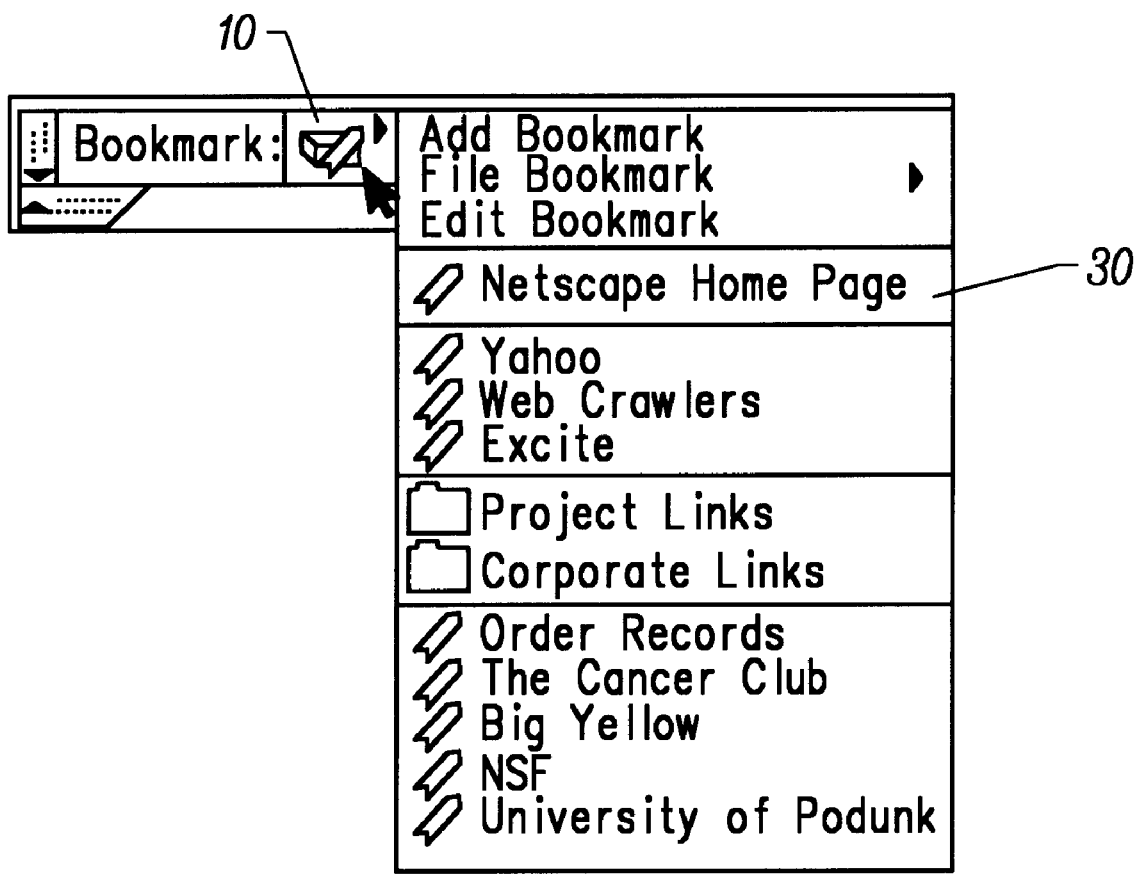
FIG. 3 is a schematic representation of a portion of a browser display showing the operation of a page proxy for bookmarking URLs according to the invention.

FIG. 3 is a schematic representation of a portion of a browser display showing the operation of a page proxy for bookmarking URLs according to the invention. The top level bookmark menu item is replaced with bookmark access on the location bar. The bookmark button 10 drops down to reveal the bookmark menu 30. The bookmark menu provides a navigation aid that allows a list of hierarchically organized folders and sub-menus to be accessed and to provide a repository in which to drop a bookmark that has been dragged to the button 10. The bookmark menu also provides a list of actions that may be taken such as, for example "Add Bookmark," "File Bookmark," or "Edit Bookmark."

Figure 4A:
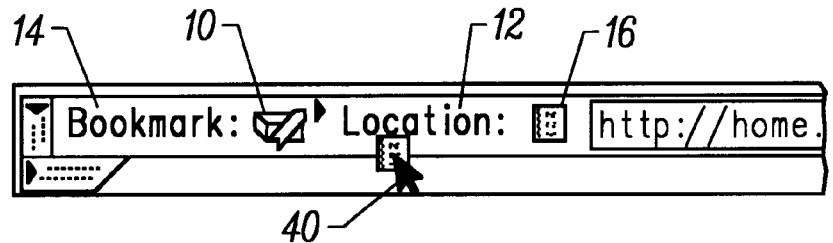
FIGS. 4a–4c provide a schematic representation of a portion of a browser display showing a sequence of steps for using a page proxy for bookmarking URLs according to the invention.
Figure 4B:
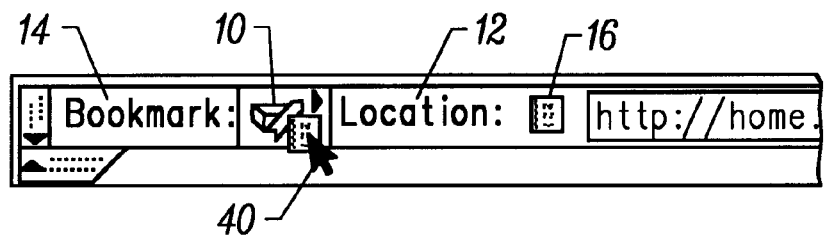
Figure 4C:
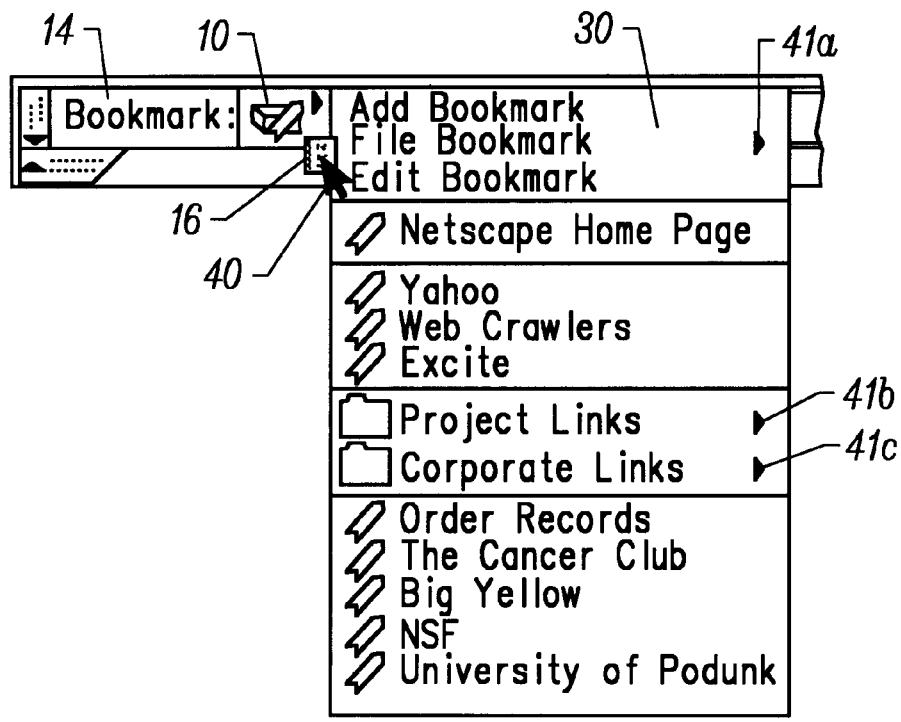

FIGS. 4a–4c provide a schematic representation of a portion of a browser display showing a sequence of steps for using a page proxy for bookmarking URLs according to the invention. In FIG. 4a, a cursor gesture 40 is used to drag a location proxy 16 from the location field 12 to the proxy icon 10 (FIG. 4b). As a result, the bookmark button 10 is actuated, causing the bookmark menu 30 to drop down. The bookmark may then be dropped into an appropriate folder within the list of folders that appears in the bookmark menu, or within a folder in a sub-menu (as indicated by the arrows 41a–41c), or an action may be taken (as discussed above).

The following table provides a list of actions and behaviors of the bookmark menu.

TABLE 6

Bookmark Menu Actions

| Action | Behavior |
| --- | --- |
| Mouse-over | Borderless button feedback (see FIG. 1). |
| Mouse click (down-up) | Drop-down menu displays itself (see FIG. 3). |

TABLE 6-continued

Bookmark Menu Actions

| Action | Behavior |
| --- | --- |
| Mouse-down, hold | Drop-down menu displays itself (see FIG. 3). |
| Mouse click outside (menu) when drop-down menu displayed | Close drop-down bookmark menu. |
| Other gesture, e.g. keystroke or control character | Drop-down bookmark menu. |
| Other gesture, e.g. keystroke or control character | Add the current page as a bookmark. |
| Other gesture, e.g. keystroke or control character | Open the bookmark window. |
| Arrow keys when drop-down is open | Up/Down keys traverse the list of bookmark. |
| Esc key when drop down is open | Close the drop-down. |

Bookmark Menu

In the preferred embodiment of the invention, the bookmark list is available from two locations, i.e. the bookmark drop-down menu in the location bar, and as sub-menu in the Window menu. Both menus are identical and contain the items shown in the following table.

TABLE 7

Bookmark Drop-Down Menu

| Name | Action | Gesture | Shortcut |
| --- | --- | --- | --- |
| Add Bookmark | Add the current page as a bookmark at the bottom of the bookmark list below the separator. | ctrl+D (cmd+D on Mac) | alt+B, A |
| File Bookmark | Pull-right menu with a list of bookmark folders and individual bookmarks. Selecting a folder places the currently displayed page as selected by the user as a bookmark relative to a visual cue. There is a folder called "Top-level" bookmarks. | ctrl+E (cmd+E on Mac) | alt+B, F |
| Edit Bookmarks . . . Open the bookmark window. | | ctrl+B (cmd+ B on Mac) | alt+B, E |
| ------------------ | A separator line, divides above commands from bookmark list. | N/A | N/A |
| Bookmark list - folders and individual items | A list of single bookmarks and folders based on user defined order in the bookmark window | N/A | N/A |

Filing Bookmarks

One feature of the invention is the ability to file bookmarks. There are two ways to file bookmarks in the preferred embodiment of the invention, i.e. via a drag and drop gesture to the bookmark icon in the location bar and the menu item in the Bookmarks sub-menu.

The drag and drop gesture to the bookmark button behaves as described in the following table.

TABLE 8

Drag and Drop To Bookmark Menu

| Mouse Action | Behavior |
|---|---|
| Mouse down and drag the proxy icon over the bookmark button and hold for 0.5 sec. | Drops down the menu to the right of the button while dragging, an outline of bookmark icon follows the mouse pointer. Options highlight in the list as they are passed over by the arrow cursor to provide a visual cue to the user of the location at which the bookmark is to be placed (see FIG. 3). |
| Mouse down and drag proxy icon over the bookmark button, mouse up before 0.5 sec. Mouse up over drop-down with proxy icon. | A link to the page is added to the bookmark list at a user selected location as indicated by a visual cue. A bookmark is added below the currently selected item. For example, if a bookmark Foo in folder Bar is highlighted, the new bookmark is added below Foo in the folder Bar. |

Bookmark Window

Figure 5:
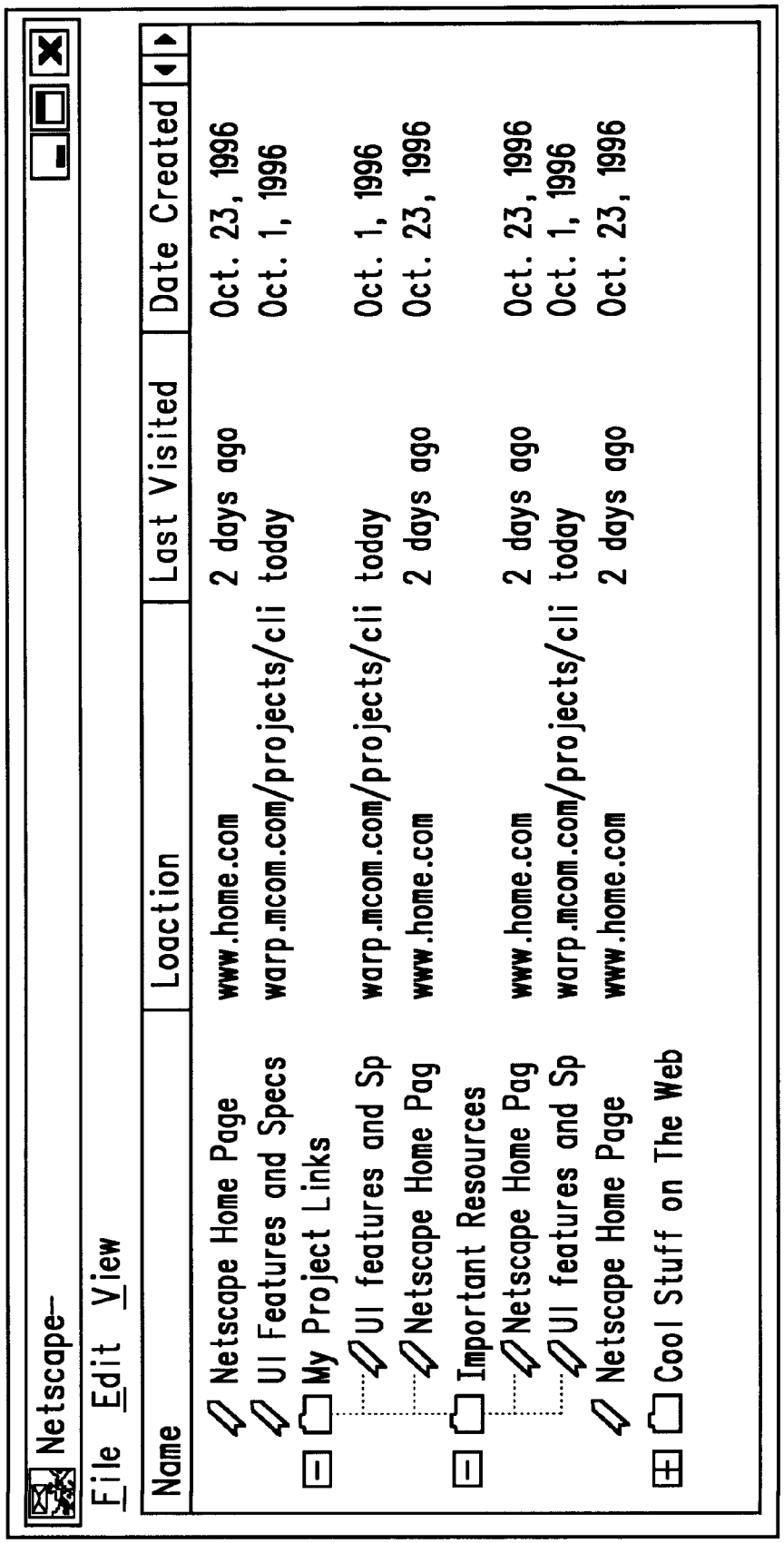
FIG. 5 is a schematic representation of a portion of a browser display showing a bookmark window according to the invention.

FIG. 5 is a schematic representation of a portion of a browser display showing a bookmark window according to the invention. Users open the bookmark window via the "Edit Bookmarks . . . " command in the Bookmark menu. The top-level bookmark container reads "Bookmarks for . . . ." Users can perform the following operations in this window (see FIG. 5):
Create a new bookmark;
Edit an existing bookmark;
Create a user defined bookmark structure;
Insert a separator; and
Sort by column criteria.

The bookmark window includes bookmarks, folders, sortable columns, and a tool bar. The bookmark window retains the ability to order bookmarks.

Actions on bookmarks and folders that may be performed in the bookmark window and that are similar to those found in state of the art browsers include:
Bookmark:
  Single click: Selection; and
  Double click: Load bookmark in browser.
Folder:
  Single click: Selection; and
  Double click: Expand hierarchy.

Default Folders

The bookmark window contains the following folders by default, i.e. Guide and Tool bar Items. When there is no bookmark.html file on the system at installation a default file is installed.

Sortable Columns

The columns in the window are mirrored from a bookmark property dialog. A column show/hide feature allows users to choose which columns to display. The columns and sort criteria include those features set forth in the following table.

TABLE 9

Sortable Columns

| Column | Sort Criteria | Behavior | Default State |
|---|---|---|---|
| Name | Sorted by user defined order - not alphabetical | Maintains the hierarchical list based on user sort order. Does nothing if it is the current sort criteria and the user accesses it again. This order is remembered and returned to if the list is flattened. This is the only sort in which users can move and reorder folders/items. | Shown |
| Location (URL) - minus the protocol | Alphabetical (second order sort by date last visited) | Flattens the list and sorts descending on first click, sorts ascending on second click. The protocol is removed (http, ftp, etc) from the address. | Shown |
| Last Visited | Chronologically | Flattens the lists and sorts descending by default. A second click on the sort order column changes the sort to ascending. | Shown |
| Date Created | Chronologically descending is default, a second click on the sort order column changes to ascending. | Flattens the lists and sorts descending by default, a second click on the sort order column changes to ascending. | Shown |
| Type | Alphabetical (second order sort by date last visited) | Displays the protocol for the page - http, ftp, or ldap. Flattens the lists and sorts descending by default, a second click on the sort order column changes to ascending. | Hidden |

Users can reorder their bookmarks via a drag and drop gesture, as well as via a menu item that moves the selection up or down in the hierarchy. The name sort order is based on the user defined order, not alphabetical order. When the sort order is other than Name, users are not able to reorder the bookmarks.

Find in the Bookmark Window

The find dialog allows a user to find a text string in, for example name, location, and description (checkbook options) fields, and match the case and whole word (also checkbox icons).

Checking Bookmarks

Figure 6A:
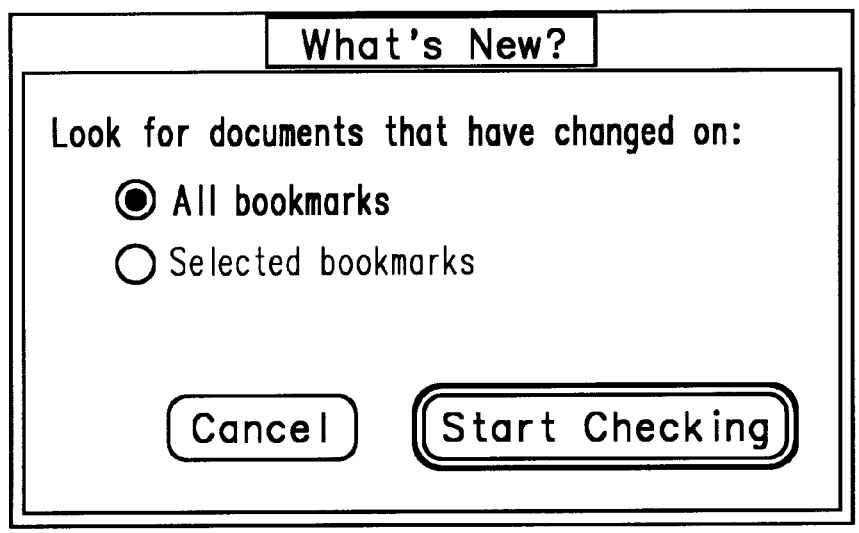
FIGS. 6a–6b provide a schematic representation of a portion of a browser display showing a sequence of steps for checking bookmarks according to the invention.
Figure 6B:
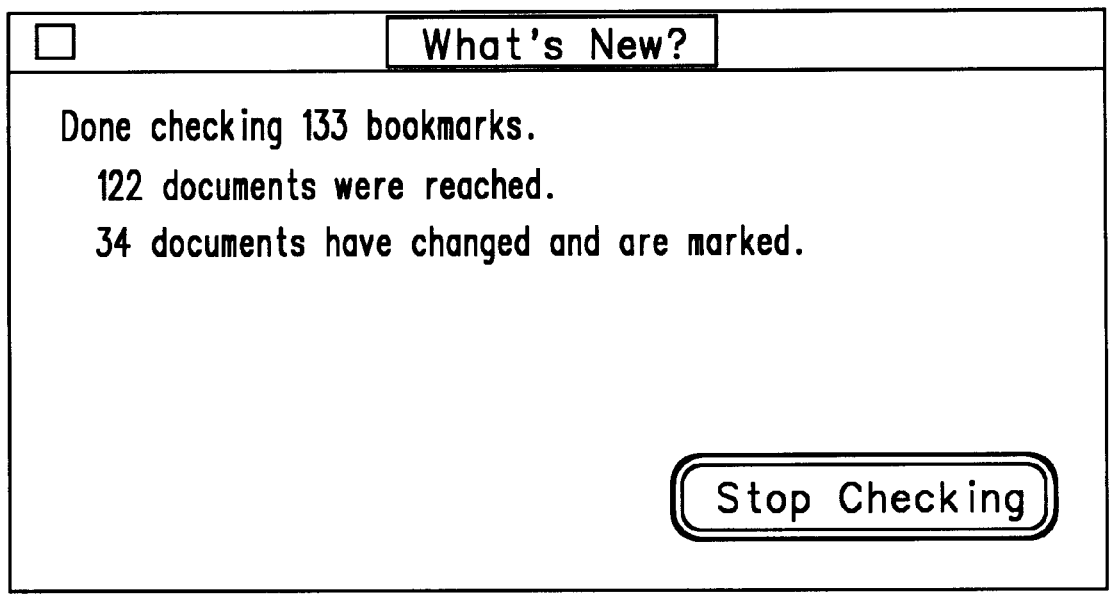

FIGS. 6a–6b provide a schematic representation of a portion of a browser display showing a sequence of steps for checking bookmarks according to the invention. The "Check Bookmarks" command allows a user to check a bookmark list for updates. Choosing the command brings up the dialog shown in FIGS. 6a and 6b.

Property Dialog

The URL is automatically entered in the Location field in the Bookmarks Item Properties dialog. The title of the object being added is automatically entered in the Title field in the Bookmarks Item Properties dialog, but the text field is preselected when the dialog is opened to afford editing. The button page defaults to the URL of the current page.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

I claim:

1. A page proxy apparatus for managing representations of page information, comprising:
    a proxy tool for manipulating a page proxy displayed in a window; and
    a navigation aid that provides an organization view of page proxy destination locations and actions.

2. The apparatus of claim 1, wherein said page proxy is manipulated by the use of a gesture.

3. The apparatus of claim 2, wherein said gesture comprises:
    mouse-over and click; and
    drag and drop;
    wherein a cursor is moved over said page proxy by use of a mouse, a button on said mouse is clicked to attach said page proxy to said cursor, and said mouse is used to drag said page proxy to said navigation aid, where said page proxy is then dropped by releasing said mouse button.

4. The apparatus of claim 1, wherein said proxy tool comprises a page proxy icon, which is located on a menu bar proximate to a page location field.

5. The apparatus of claim 1, wherein said navigation aid comprises a drop down menu that includes hierarchically arranged contents, including multiple levels of sub-menus, and that also includes various actions.

6. The apparatus of claim 1, wherein said page proxy manages Web page locations in the form of Uniform Resource Locators (URLs) as Web page bookmarks.

7. The apparatus of claim 6, wherein information about a bookmarked location may be collected and stored for later use.

8. The apparatus of claim 6, wherein information may be added by a user at the time a bookmark is entered.

9. The apparatus of claim 7, wherein said information about a bookmarked location includes any of page name, URL, data acquired, and date last visited.

10. The apparatus of claim 8, wherein said user added information includes any of The following is a table of informative name and notes.

11. The apparatus of claim 6, wherein the types of information/documents that can be bookmarked include any of Web pages, mail/news messages, categories, mail folders, newsgroups, and files.

12. The apparatus of claim 1, wherein said page proxy is implemented as an icon which represents a given window.

13. The apparatus of claim 12, wherein said icon is animated when a gesture is used, to give a user an indication that said icon can be manipulated.

14. The apparatus of claim 2 wherein said gesture is a drag and drop gestures with which any of the following actions can be performed with the page proxy: create a link to a page in a bookmark file, create a link to a page in a tool bar and add said link to a tool bar folder in a bookmarks window, open a page in another browser window, open a page, attach a page in line, create a link to a page, print a page, make a selection a link to a page, paste a page title and make a link to said page title, make a bookmark to a page.

15. The apparatus of claim 1, wherein said page proxy may be used in folder, thread, and message windows of a network interface device.

16. A method for managing representations of page information, comprising the steps of:
    manipulating a page proxy displayed in a window with a proxy tool; and
    providing an organization view of page proxy destination locations and actions with a navigation aid.

17. The method of claim 16, wherein said manipulating step comprises the step of:
    using a cursor gesture to drag a location proxy from a location field to a proxy icon, wherein a button is actuated, causing a menu to drop down, wherein said page proxy may then be dropped into an appropriate folder within a list of folders that appears in said menu, within a folder in a sub-menu, or wherein an action may be taken.

18. The method of claim 16, wherein said manipulating step comprises the steps of:
    mouse down and drag a proxy icon over a button and hold to drop down a menu;
    mouse down and drag said proxy icon over said button and mouse up to add a link to a page; and
    mouse up over drop-down with said proxy icon to add a bookmark below a currently selected item.

19. The method of claim 16, wherein said manipulating step comprises any of the following operations create a new bookmark, edit an existing bookmark, create a user defined bookmark structure, insert a separator, and sort by column criteria.

20. The method of claim 16, further comprising the step of:
    providing a bookmark window that includes any of bookmarks, folders, sortable columns, and a tool bar.

* * * * *